(12) United States Patent
Suzuki

(10) Patent No.: US 7,940,410 B2
(45) Date of Patent: May 10, 2011

(54) DEVICE AND METHOD FOR MANAGING ELECTRONIC DOCUMENTS, STORAGE MEDIUM FOR STORING ELECTRONIC DOCUMENT MANAGEMENT PROGRAM, AND IMAGE FORMATION DEVICE

(75) Inventor: Takanobu Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1261 days.

(21) Appl. No.: 11/486,676

(22) Filed: Jul. 14, 2006

(65) Prior Publication Data

US 2007/0206205 A1    Sep. 6, 2007

(30) Foreign Application Priority Data

Mar. 3, 2006   (JP) ................................. 2006-057609

(51) Int. Cl.
   *G06F 3/12*  (2006.01)
   *G06K 15/00*  (2006.01)
(52) U.S. Cl. ..................... 358/1.15; 358/1.14; 358/1.18
(58) Field of Classification Search ........ 358/1.12–1.18, 358/3.28; 382/306; 726/26; 713/176; 715/523, 715/234
See application file for complete search history.

(56) References Cited

U.S. PATENT DOCUMENTS

| | | | |
|---|---|---|---|
| 6,421,691 B1* | 7/2002 | Kajitani ...................... | 715/234 |
| 6,650,794 B1* | 11/2003 | Aoki ............................. | 382/306 |
| 6,975,417 B1* | 12/2005 | Hilpl et al. .................. | 358/1.15 |
| 7,007,303 B2* | 2/2006 | Goldberg et al. ............... | 726/26 |
| 7,113,297 B1* | 9/2006 | Yamaguchi et al. .......... | 358/1.15 |
| 7,268,906 B2* | 9/2007 | Ruhl et al. .................... | 358/1.15 |
| 7,302,576 B2* | 11/2007 | Greene et al. ................. | 713/176 |
| 7,511,845 B2* | 3/2009 | Inikori ........................ | 358/1.15 |
| 7,818,456 B2* | 10/2010 | Carro ............................ | 709/246 |
| 2005/0151999 A1* | 7/2005 | Inikori ......................... | 358/1.18 |
| 2005/0235202 A1* | 10/2005 | Chen et al. .................... | 715/523 |
| 2007/0019244 A1* | 1/2007 | Rekiere ........................ | 358/3.28 |

FOREIGN PATENT DOCUMENTS

| | | |
|---|---|---|
| JP | 2001230923 | 8/2001 |
| JP | 200562970 | 3/2005 |
| JP | 2005150852 | 6/2005 |

OTHER PUBLICATIONS

English translation of Notice of Grounds for Rejection issued in connection with Japanese Patent Application Serial No. 2006-057609 mailed on Aug. 17, 2010.

* cited by examiner

*Primary Examiner* — James A Thompson
*Assistant Examiner* — Satwant K Singh
(74) *Attorney, Agent, or Firm* — Gauthier & Connors LLP

(57) ABSTRACT

The present invention provides an electronic document management device including a reading unit that reads out an original electronic document formed by combining document data indicating a main document and management data for managing the electronic document as a printed object from a section where the document is registered, a processing unit that processes the management data of the read original electronic document to form an electronic document to be printed, and a print instruction unit that causes an image formation device to print the electronic document to be printed.

20 Claims, 4 Drawing Sheets

DEVICE AND METHOD FOR MANAGING ELECTRONIC DOCUMENTS, STORAGE MEDIUM FOR STORING ELECTRONIC DOCUMENT MANAGEMENT PROGRAM, AND IMAGE FORMATION DEVICE

BACKGROUND

1. Technical Field

The present invention relates to techniques for managing an electronic document to be printed, and more particularly to a technique for handling an electronic document having management data embedded therein.

2. Related Art

Techniques for using an original electronic document for duplicating a paper document printed on the basis of the electronic document are known. According to such a technique, the paper document is scanned to read identification information included in the paper document, and a printing operation is performed on the basis of the original electronic document acquired from the identification information.

SUMMARY

According to an aspect of the present invention, there is provided an electronic document management device including a reading unit that reads out an original electronic document formed by combining document data indicating a main document and management data for managing the electronic document as a printed object from a section where the document is registered, a processing unit that processes the management data of the read original electronic document to form an electronic document to be printed, and a print instruction unit that causes an image formation device to print the electronic document to be printed.

BRIEF DESCRIPTION OF THE DRAWINGS

Exemplary embodiments of the present invention will be described in detail by reference to the following figures, wherein.

DETAILED DESCRIPTION

Figure 1:
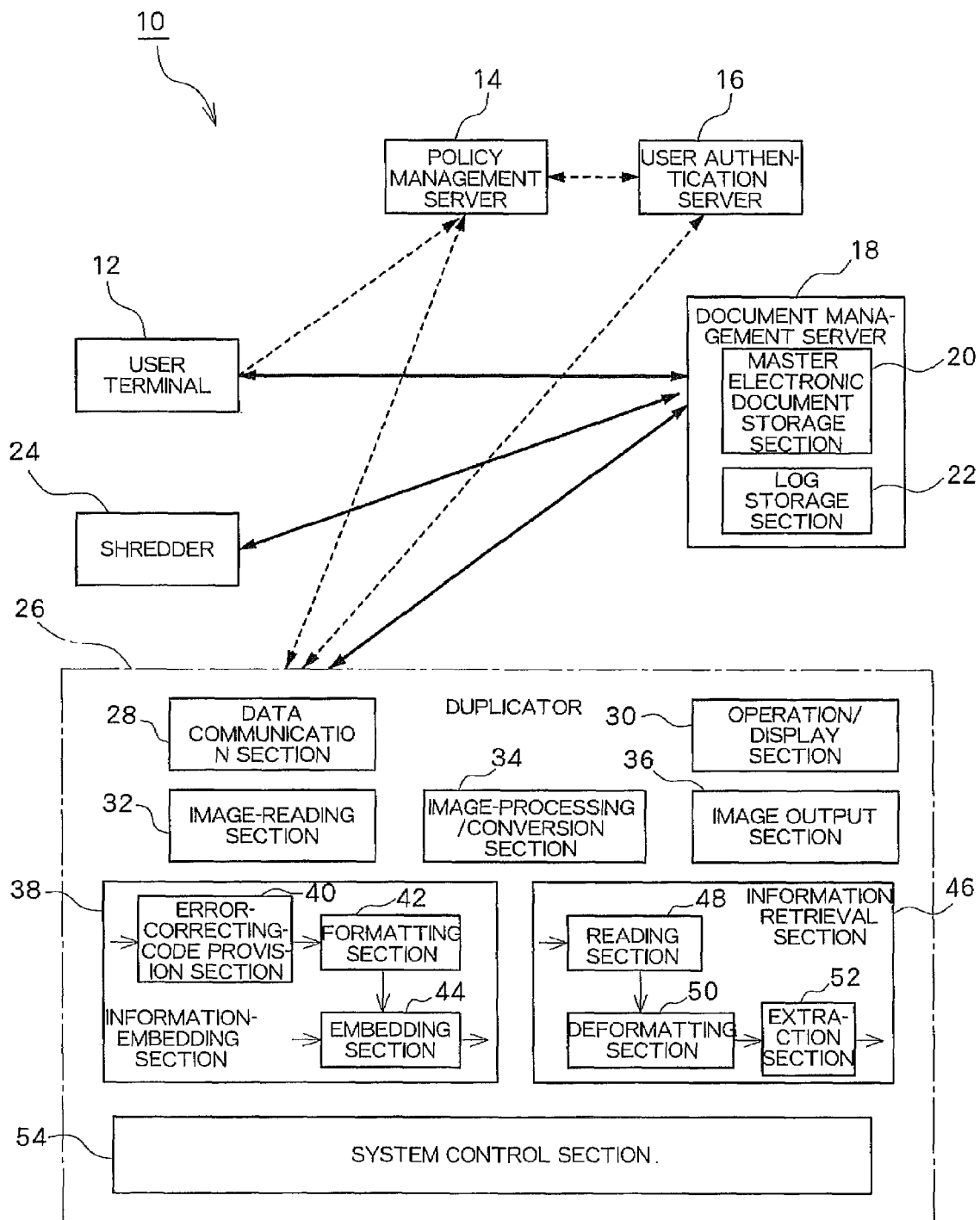
FIG. 1 is a schematic block diagram showing the configuration of an electronic document system.

FIG. 1 is a schematic block diagram showing the configuration of an electronic document system 10 according to an exemplary embodiment of the present invention. The electronic document system 10 includes a user terminal 12, a policy management server 14, a user authentication server 16, a document management server 18, a shredder 24, and a duplicator 26 as main components. The components are mutually communicable via a network.

The user terminal 12 is a device functioning as a client in the electronic document system 10. The user terminal 12 performs operations on the basis of an instruction from a user, such as forming a new electronic document, saving the formed electronic document in the document management server 18, setting a security policy for the policy management server 14, issuing an instruction to duplicate a document to be printed, issuing an instruction to print the electronic document, and the like. Although the user terminal 12 is typically formed from a PC (personal computer), various pieces of equipment, such as a multifunction device capable of converting content data into an electronic document, can be used as the user terminal 12 in the electronic document system 10.

The policy management server 14 is a server for managing a security policy defining access rights to electronic documents stored in the document management server 18. Upon registration of an electronic document, a security policy is set in the document management server 18, and checked when access is made to the electronic document (reading, writing, and the like). The user authentication server 16 is a server for authenticating a user using the electronic document system 10. The authentication can be performed by means of a password, a public key certificate, and the like.

The document management server 18 is a server for storing and managing electronic documents, and is formed from a file server, a storage device, such as a local storage device for various pieces of equipment, and the like. The document management server 18 includes a master electronic document storage section 20 and a log storage section 22. The master electronic document storage section 20 functions as a repository, registering and storing a master electronic document as an original electronic document. The master electronic document is formed by combining document data forming the document and management data used for managing the master electronic document. Upon registration or the like of the original electronic document, management data are embedded into the input document data when necessary to form a master electronic document for management. Such management data may be embedded as nonprinted data in the form of, for example, a comment text, but at least part of the data is formed to be printed when the electronic document is printed. The management data may be formed so that their presence becomes obvious when printed, or so that the data are printed as a latent image.

The log storage section 22 records and manages various processes performed when, for example, the master electronic document is registered, read out, printed, modified, or deleted. The log storage section 22 may further record that the printed document formed by printing the master electronic document is scanned or disposed via the shredder 24.

The shredder 24 is a device for shredding a sheet of paper into indecipherable jots through cutting or melting to thereby destroy the document written on the sheet. A sheet slot of the shredder 24 is provided with a reading device for reading management data printed on the inserted sheet. The read information is provided to the document management server 18, and such provision is recorded in the storage section 22.

The duplicator 26 is a device having a scanner function and a printing function. The duplicator 26 includes a data communication section 28, an operation/display section 30, an image-reading section 32, an image-processing/conversion section 34, an image output section 36, an information-embedding section 38, an information retrieval section 46, and a system control section 54 as main components.

The data communication section 28 communicates with the devices, such as the document management server 18, via the network. The operation/display section 30 is a user interface for receiving an operation instruction from a user, and displaying a process result to the user. Generally, the operation/display section 30 is formed from a liquid crystal panel.

The image-reading section 32 includes a scanner to read information on the sheet. The image-processing/conversion section 34 performs enlarging/reducing operations and the like on the electronic document to be printed, as well as an operation of converting the document into the data format recognizable by the image output section 36. The section 36 has a printer function to print a sheet on the basis of the electronic document, and output the printed document.

The information-embedding section 38 performs a process of embedding management data in the electronic document, and includes an error-correcting-code provision section 40, a formatting section 42, and an embedding section 44. The management data to be embedded into the electronic document are provided with an error-correcting code by the error-correcting-code provision section 40, and subjected to a formatting process to be turned into a latent image by the formatting section 42, and embedded into the electronic document by the embedding section 44. The information embedding section 38 can remove the management data already embedded therein.

The information retrieval section 46 retrieves the management data embedded in the electronic document, and includes a reading section 48, a deformatting section 50, and an extraction section 52. The management information in the electronic document is read by the reading section 48, the format thereof is converted into a normal data format by the deformatting section 50, and the information is extracted by the extraction section 52.

The system control section 54 controls the entire duplicator 26, controlling operation timing of the various components and managing data communication among the components.

Next, operation of the electronic document system 10 will be schematically described with reference to FIG. 2.

Figure 2:
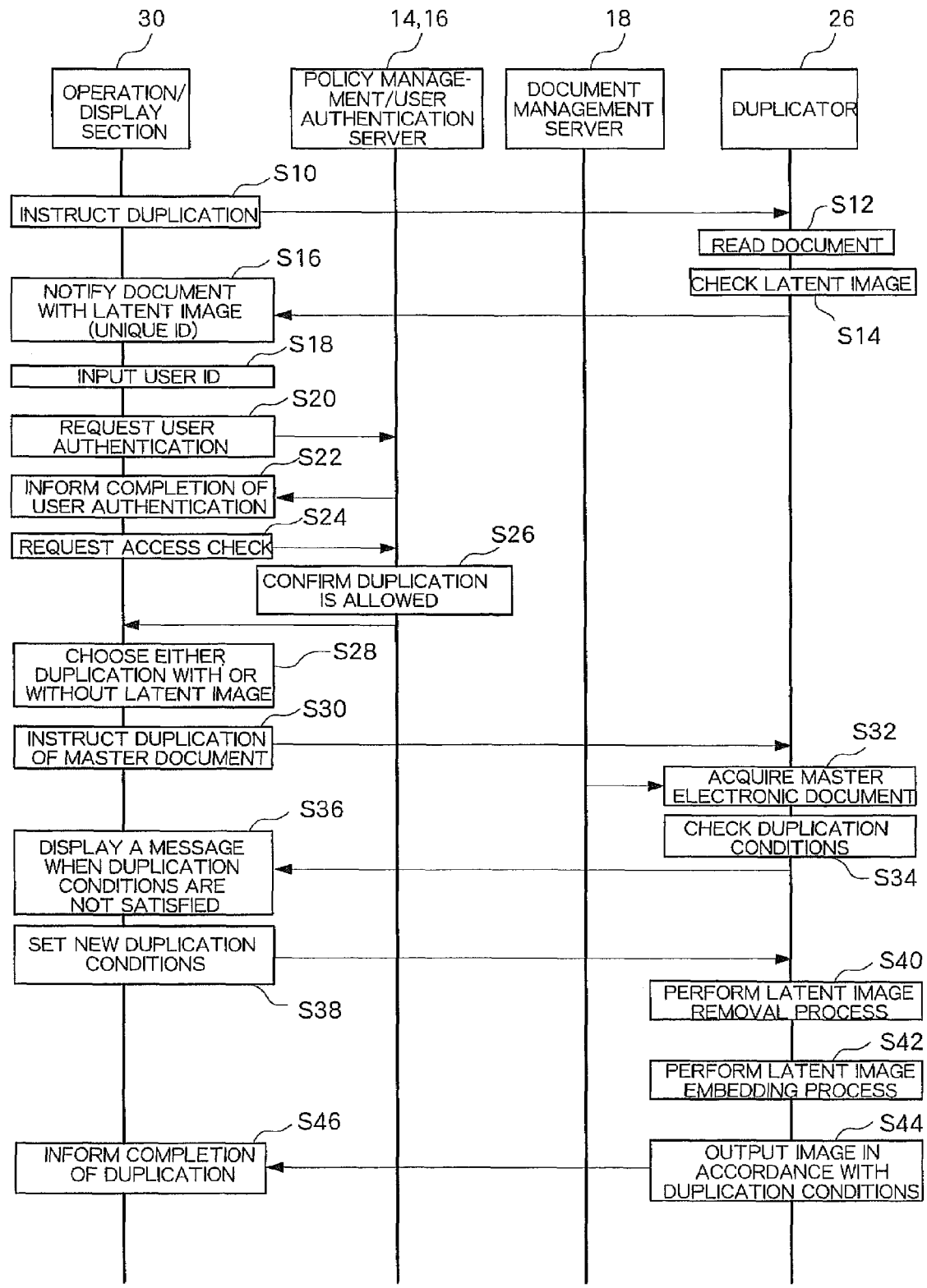
FIG. 2 is a sequence chart showing a process flow.

FIG. 2 is a sequence chart illustrating the steps in a process of duplicating a document to be printed. Although in this example a user issues various instructions and confirms the result using the operation/display section 30 of the duplicator 26, in the figure the operation/display section 30 is shown separately from the duplicator 26 so as to clearly outline the processing performed by the user and the processing performed by the duplicator 26.

In the duplication process, a duplication instruction is provided to the system control section 54 and the like of the duplicator 26 on the basis of user input from the operation/display section 30 (S10). Upon receiving the instruction, the image-reading section 32 in the duplicator reads a document of interest to produce scan data (S12), and the information retrieval section 46 determines whether or not the scan data include management data rendered into a latent image, and reads the data (S14). The read management data are transmitted to the operation/display section 30 (S16).

Next, at the operation/display section 30, the user enters a user ID, password, and the like. The operation/display section 30 requests the user authentication server 16 to perform user authentication (S20), and is informed of completion of user authentication (S22). Further, the operation/display section 30 requests the policy management server 14 to check the access rights to the master electronic document corresponding to the management data (S24). The policy management server 14 retrieves the corresponding security policy to confirm that the document can be duplicated (S26), and informs the operation/display section 30 of the result.

At the operation/display section 30, selection is made as to whether to print the document provided with a latent image indicating management data or the document without the latent image (S28), and the section issues a print instruction to the duplicator 26 (S30). In this step, the management data (or master electronic document identification information included in the management data) are transmitted to the duplicator 26 in order to specify the master electronic document, together with data indicating that duplication based on the master electronic document is to be performed, and data specifying duplication conditions (printing conditions), such as resolution. The duplicator 26 acquires the master electronic document from the document management server 18, and checks whether or not a printing operation satisfying the duplication conditions can be performed by use of the master electronic document (S34). If the duplication conditions cannot be satisfied, a message indicating that fact is displayed on the operation/display section 30 (S36), which receives the newly input duplication conditions (S38).

In accordance with the setting, the duplicator 26 performs the process of removing an unnecessary latent image (S40), and embedding a latent image indicating a print serial number and the like (S42) before outputting the image in accordance with the duplication conditions. The duplicator 26 informs the operation/display section 30 that the duplication is complete (S46), and terminates the duplication process.

Figure 3:
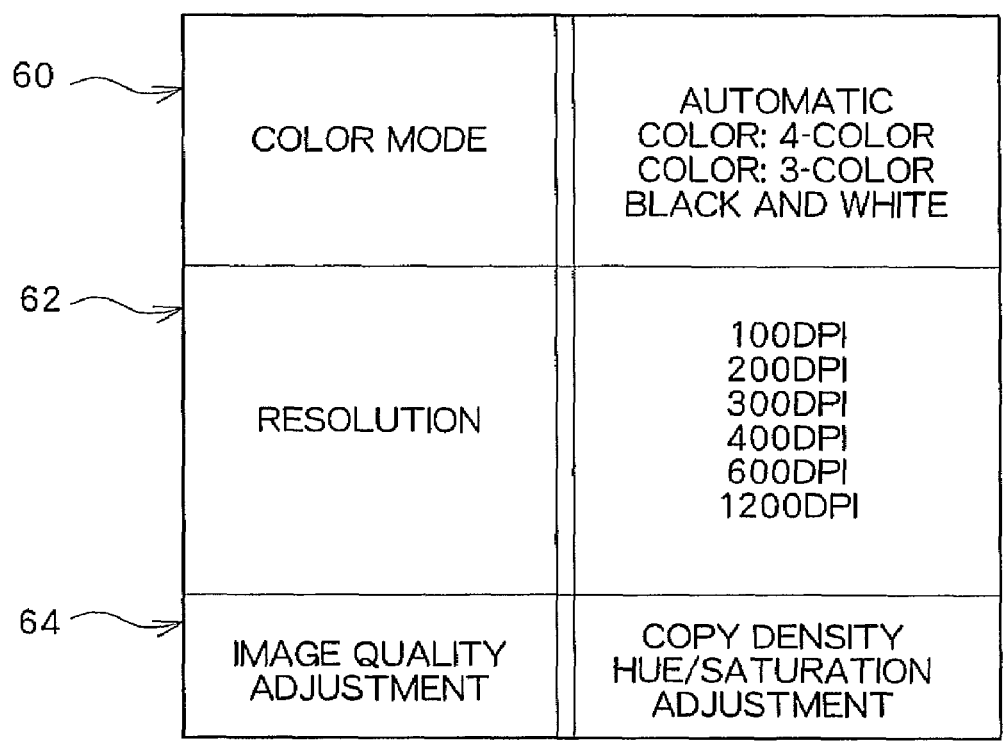
FIG. 3 shows example duplication conditions.

An example of setting the duplication conditions will be described with reference to FIG. 3. In the example of FIG. 3, a color mode 60, a resolution 62, and an image quality adjustment 64 are shown as the duplication conditions set at the operation/display section 30. The color mode 60 can be set by choosing "automatic" indicating that a standard setting is used, "color: 4-color" for printing in four colors of CMYK, "color: 3-color" for printing in three colors of CMY, or "black and white" for monochromatic printing. The resolution 62 is set by choosing "100 DPI," "200 DPI," "300 DPI," "400 DPI," "600 DPI," or "1200 DPI." The image quality adjustment 64 is made for "copy density" and "hue/saturation adjustment."

The duplicator 26 determines whether or not the master electronic document can satisfy such conditions. Assuming that the master electronic document is monochromatic and has a resolution of 200 DPI, the color printing operation cannot be performed even though the user chooses "color: 4-color" as the duplication conditions. Similarly, even though the user chooses the resolution of "600 DPI," data in this resolution cannot be obtained unless an interpolation process or the like is performed. Accordingly, a message indicating that the document can be printed only in "black and white," and that either the resolution "100 DPI" or "200 DPI" can be chosen is displayed at the operation/display section 30 to thereby prompt the user to input new duplication conditions.

Figure 4:
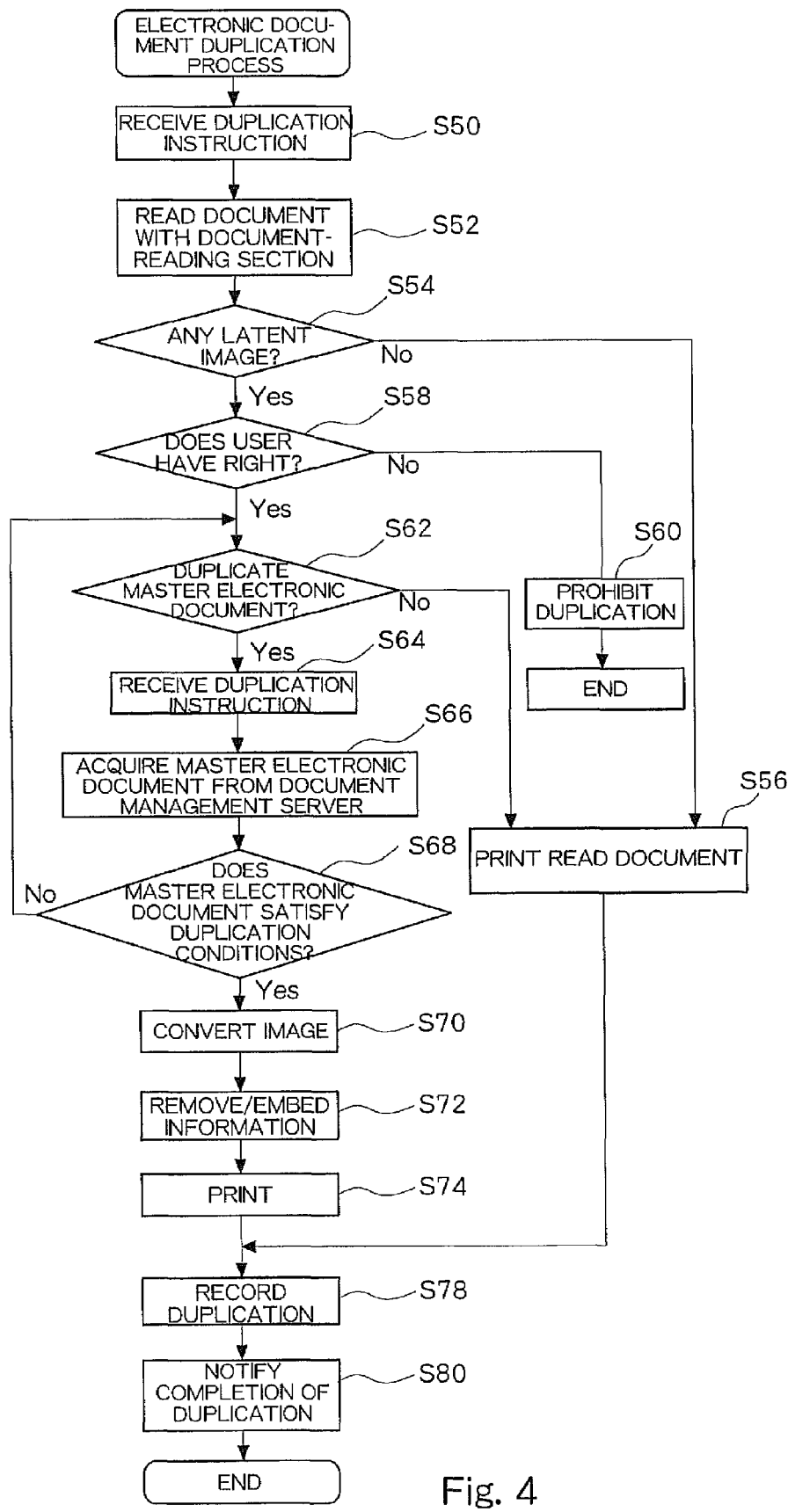
FIG. 4 is a flowchart of a process flow.

The process flow in the duplicator 26 will be described in detail with reference to the flowchart of FIG. 4. For duplicating an electronic document, the duplicator 26 first receives a duplication instruction issued by a user from the operation/display section 30 (S50). The document-reading section 32 scans the set document (S52) to produce scan data. The information retrieval section 46 checks whether or not a latent image indicating management data is included in the scan data (S54); i.e. whether or not the document is printed on the basis of the master electronic document stored in the document management server 18. If no latent image is included, the section determines that an ordinary duplication process is to be performed, thereby printing scan data (S56).

On the other hand, if a latent image is included, identification data (unique ID) of the master electronic document, data of the repository storing the data (such as the document management server 18), data of the user performing the printing operation, data of the printing time and date, and the like are retrieved from the extracted management data to make an inquiry to the policy management server 14 about the security policy (S58). When the result shows that the user does not have the right to duplicate the master electronic document, a message indicating that duplication is not allowed is displayed (S60) to thereby terminate the process. On the other hand, if the user has the duplication right, a message asking whether to print on the basis of the master electronic document or on the basis of scan data is displayed at the operation/ display section 30 (S62). If an instruction to print on the basis of the scan data is issued, a printing operation is performed on the basis of the scan data (S56) If an instruction to print on the basis of the master electronic document is issued (S64), the master electronic document is acquired from the document management server 18 (S66), and data to be newly embedded as a latent image (management data) are acquired when necessary.

Next, a determination is made as to whether or not the master electronic document satisfies the input duplication conditions (S68). If the conditions are not satisfied, such a message is displayed at the operation/display section 30 to thereby prompt the user to set new conditions or select the printing option based on the scan data. If the conditions are satisfied, image conversion for adapting to the conditions is performed (S70), the already existing management data are deleted and new management data are embedded (S72), and then the document is printed. Information indicating that the document is duplicated is transmitted to the document management server 18 and recorded in the log storage section 22 (S78), and is also displayed at the operation/display section 30 to thereby terminate a series of process steps (S80).

Below are described various exemplary embodiments. Note that some exemplary embodiments are the same as the above description.

An electronic document management device can be formed from a computer including hardware having calculation and storage functions, and software defining the operation thereof. General purpose PCs (personal computers) and work stations, for example, can be used as the computer. Alternatively, image formation devices can be used, such as a printer, a duplicator (a device including a printer and a scanner), and a multifunction device (device including multiple image processing functions performed by a printer, a scanner, a facsimile, and the like), or a file server including a storage device. Further, the electronic document management device can be formed as a built-in device, such as a microprocessor built in the above-described computer. The electronic document management device can be formed as a centralized processing device using a single computer, or a distributed processing device using multiple communicable computers.

A reading unit is a unit that reads out an original electronic document registered within the device or in an external device. That is, the reading unit actively acquires a necessary original electronic document, rather than passively receiving input of the original electronic document. The original electronic document is an electronic document that is registered and managed. Although the manner in which the original electronic document is used depends on users' preference, typically it is used as a master electronic document or an electronic original replacing a formal paper archived document. The original electronic document is formed by combining document data and management data as a printed object. More specifically, when the original electronic document is simply printed, at least part of management data is printed either obviously or as a latent image on the sheet in addition to the document data. Note that the document data are the data expressing the contents of the document, and are structured by, for example, data formed with application software, such as word processing software or spreadsheet software, or image data formed by reading an image by means of a scanner or the like. The management data are used for managing the original electronic documents. The management data typically includes identification data (identification ID) of the original electronic document, and may also include a digital signature (electronic signature) to guarantee the authenticity, or a timestamp. Further, the management data may include various data, such as data indicating data attributes including the data format, resolution, color expression of the original electronic document, history data indicating the name of the person who has produced the original electronic document, the time and date of production, the person who registered the document, the time and date of registration, registered directory, time and date of printing, and the like, and access right data indicating the authority to read or process the original electronic document. No particular limitations are imposed on the data format of the original electronic document, and various application software formats (such as .doc, .ppt, .jtd) and various standard formats (such as .tiff, .pdf) may be used.

A processing unit processes the management data of the read original electronic document to produce the electronic document to be printed. Note that the term "processing" refers to performing a process, such as deletion, addition, and rewriting, on part or all of the original management data to change the contents, thereby forming the electronic document to be printed having different management data from the original electronic document. The electronic document to be printed is an electronic document subjected to printing, and after being used for printing may be immediately deleted, or registered and stored. Upon formation of the electronic document to be printed, data conversion, such as data format conversion and resolution conversion to satisfy the printing conditions, may be performed. A print instruction unit is a unit that issues to the image formation device provided internally in the device or externally an instruction to print the electronic document to be printed either directly or indirectly via a preprocessing device, such as a print management server.

According to the above-described configuration, the electronic document to be printed having different management data from the original electronic document is printed. Consequently, it is possible to delete management data that should not be printed, or to add management data that should be printed. The management data not to be printed include, for example, voluminous data, and data to be kept secret on the paper medium. The management data to be printed include, for example, data specifying the individual printed document (that can be implemented as a serial number or the like), and data specifying the person who performed the printing operation. Although typically the original electronic document is not modified even after the processes are performed by the processing unit and the print instruction unit, the management data portion of the original electronic document may be revised by, for example, replacing the original electronic document with the electronic document to be printed or processing the management data of the original electronic document.

According to an aspect of the electronic document management device of the present invention, the processing performed on the management data by the processing unit is the process of adding data characterizing the print instruction issued by the print instruction unit to the management data. The data characterizing the instructed printing operation include, for example, identification data for specifying the printed document (such as a serial number), data related to the printed time and date, the name of the printer, and the person performing the printing operation. As a result, the origin of the printing document is specified, thereby enhancing security and traceability.

According to another aspect, the electronic document management device of the present invention includes a record management unit that manages a record of the print instruction issued by the print instruction unit in association with the original electronic document. The record management unit is a unit that manages the record (log) of the original electronic document, and manages the record of printing operations instructed by the print instruction unit. The record management unit can of course manage various other records, such as a record related to registration of the original electronic document. Note that the record data is generally formed as a different file from the original electronic document. However, it may also be integrally managed with the original electronic document by, for example, embedding the record data as the management data of the original electronic document.

According to a further aspect, the electronic document management device of the present invention includes a unit that acquires management data on a sheet to be destroyed from a shredder for destroying sheets, and the record management unit further manages the record indicating that the sheet has been destroyed in association with the original electronic document related to the acquired management data. In short, the record management unit manages the life cycle of the printed documents.

According to a further aspect, the electronic document management device of the present invention includes a unit that receives print conditions based on input from a user, and a unit that, when the received printing conditions are not feasible, notifies the user of the infeasibility. When the received printing conditions are feasible, the print instruction unit causes the image formation device to print the document under such print conditions. The print conditions include conditions for controlling the image formation device, such as designation of the resolution (designation of dpi and the like), color or monochromatic printing, one-sided or two-sided printing, size, and the like; image formation device selection conditions for setting the image formation device used for printing (selected from among multiple devices), and so on. Feasibility of the received print conditions is determined on the basis of the characteristics of the printer and the electronic document, and, when the conditions are not feasible, the user is notified of that fact.

According to a further aspect, the electronic document management device of the present invention includes an acquisition unit that acquires a scanned electronic document formed by scanning a sheet, and a specification unit that specifies a corresponding original electronic document on the basis of the management data included in the scanned electronic document thus acquired, and the reading unit reads out the specified original electronic document. This configuration makes it possible to perform a duplication process based on the original electronic document.

According to a further aspect, the electronic document management device of the present invention includes a scan image print instruction unit that causes the image formation device to print the scanned electronic document, and a selection unit that selects, on the basis of user input, to print either the scanned electronic document by the scan image print instruction unit or the electronic document to be printed by the print instruction unit.

The image formation device of the present invention includes an input unit used for input of an original electronic document formed by combining document data indicating a main document and management data indicating an attribute of the electronic document as a printed object, a processing unit that processes the management data of the input original electronic document to form an electronic document to be printed, and a print unit that prints the electronic document to be printed. The image formation device may be formed from a single device, or from multiple communicable devices. The input unit may actively read out the original electronic document or passively receive the input.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An electronic document management device, comprising:
   a reading unit that reads out an original electronic document formed by combining document data indicating a main contents of the electronic document and management data for managing the electronic document as a printed object from a section where the original electronic document is registered;
   a processing unit that processes the management data of the read original electronic document to generate new management data including contents differing from contents of the management data of the read original electronic document and to form an electronic document to be printed including the generated new management data and the management document data of the read original electronic document; and
   a print instruction unit that causes an image formation device to print the electronic document to be printed.

2. The electronic document management device according to claim 1, wherein processing performed on the management data by the processing unit is to add data characterizing the print instruction issued by the print instruction unit to the management data.

3. The electronic document management device according to claim 1, further comprising a record management unit that manages a record of the print instruction issued by the print instruction unit in association with the original electronic document.

4. The electronic document management device according to claim 3, further comprising a unit that acquires the management data on a sheet to be destroyed from a shredder for destroying a sheet, wherein the record management unit further manages a record indicating that the sheet has been destroyed in association with an original electronic document related to the acquired management data.

5. The electronic document management device according to claim 1, further comprising a unit that receives print conditions based on input from a user, and a unit that, when the received print conditions are not feasible, notifies a user of the infeasibility, wherein when the received print conditions are feasible, the print instruction unit causes the image formation device to print under the print conditions.

6. The electronic document management device according to claim 1, further comprising, an acquisition unit that acquires a scanned electronic document formed by scanning a sheet, and a specifying unit that specifies, on the basis of the management data included in the acquired scanned electronic document, the corresponding original electronic document.

7. The electronic document management device according to claim 6, further comprising a scan image print instruction unit that causes the image formation device to print the scanned electronic document, and a selection unit that selects, on the basis of input from a user, either to print the scanned electronic document by means of the scan image print instruction unit or print the electronic document to be printed by means of the print instruction unit.

8. An image formation device, comprising:
  an input unit used for input of an original electronic document formed by combining document data indicating a main contents of the electronic document and management data indicating an attribute of the electronic document;
  a processing unit that processes the management data of the read original electronic document to generate new management data including contents differing from contents of the management data of the read original electronic document and to form an electronic document to be printed including the generated new management data and the management document data of the read original electronic document; and
  a print unit that prints the electronic document to be printed.

9. A storage medium readable by a computer, the storage medium storing a program that causes the computer to execute an electronic document management process, the process comprising:
  reading out an original electronic document formed by combining document data indicating a main contents of the electronic document and management data for managing the electronic document as a printed object from a section where the original electronic document is registered;
  processing the management data of the read original electronic document to generate new management data including contents differing from contents of the management data of the read original electronic document and to form an electronic document to be printed including the generated new management data and the document data of the read original electronic document; and
  issuing an instruction to an image formation device to print the electronic document to be printed.

10. The storage medium according to claim 9, wherein the processing performed on the management data is to add data characterizing the instruction to print to the management data.

11. The storage medium according to claim 9, the process further comprising managing a record of the instruction to print in association with the original electronic document.

12. The storage medium according to claim 11, the process further comprising:
  acquiring the management data on a sheet to be destroyed from a shredder for destroying a sheet, wherein for management of the record, a record indicating that the sheet has been destroyed is also managed in association with the original electronic document related to the acquired management data.

13. The storage medium according to claim 9, the process further comprising receiving print conditions based on input from a user, and when the received print conditions are not feasible, notifying the user of the infeasibility, wherein upon issuing the instruction to print, an instruction is issued to the image formation device to print under the received print conditions when the print conditions are feasible.

14. The storage medium according to claim 9, the process further comprising acquiring a scanned electronic document formed by scanning a sheet, and specifying, on the basis of the management data included in the acquired scanned electronic document, the corresponding original electronic document, wherein upon reading out the original electronic document, the specified original electronic document is read out.

15. An electronic document management method, comprising:
  reading out an original electronic document formed by combining document data indicating a main contents of the electronic document and management data for managing the electronic document as a printed object from a section where the original electronic document is registered;
  processing the management data of the read original electronic document to generate new management data including contents differing from contents of the management data of the read original electronic document and to form an electronic document to be printed including the generated new management data and the document data of the read original electronic document; and
  issuing an instruction to an image formation device to print the electronic document to be printed.

16. The electronic document management method according to claim 15, wherein the processing performed on the management data is to add data characterizing the instruction to print to the management data.

17. The electronic document management method according to claim 15, further comprising managing a record of the instruction to print in association with the original electronic document.

18. The electronic document management method according to claim 17, further comprising acquiring the management data on a sheet to be destroyed from a shredder for destroying a sheet, and for management of the record, managing a record indicating that the sheet has been destroyed in association with the original electronic document related to the acquired management data.

19. The electronic document management method according to claim 15, further comprising receiving print conditions based on input from a user, and when the received print conditions are not feasible, notifying the user of the infeasibility, wherein upon issuing the instruction to print, an instruction is issued to the image formation device to print under the received print conditions when the print conditions are feasible.

20. The electronic document management method according to claim 15, further comprising acquiring a scanned electronic document formed by scanning a sheet, and specifying, on the basis of the management data included in the acquired scanned electronic document, the corresponding original electronic document, wherein upon reading out the original electronic document, the specified original electronic document is read out.

* * * * *